United States Patent Office 2,939,878
Patented June 7, 1960

2,939,878

PREPARATION OF FLUORONITRILES

Robert P. Ruh and Ralph A. Davis, Midland, Mich., assignors to The Dow Chemical Company, Midland, Mich., a corporation of Delaware No Drawing. Filed Oct. 22, 1958, Ser. No. 768,843

5 Claims. (Cl. 260—465.7)

This invention relates to the preparation of fluoronitriles, and is more particularly concerned with the preparation of chlorodifluoroacetonitrile, trifluoroacetonitrile, and 2-chlorotetrafluoropropionitrile which are fluoronitriles containing from 2 to 3 carbon atoms.

The process of the present invention includes contacting cyanogen chloride with a difluoromethane containing from 0 to 1 chlorine atoms and having a molecular weight of from 52 to 87, and separating the resulting products.

More particularly, it has been found that good yields of fluoronitriles may be obtained by contacting, at atmospheric pressure, and at temperatures of about 500° C. to about 750° C., preferably at temperatures from about 600° C. to about 650° C., and for about 5 to about 30 seconds, preferably for about 8 to about 10 seconds, cyanogen chloride with a difluoromethane containing from 0 to 1 chlorine atom and having a molecular weight of from 52 to 87. Difluoromethanes which are suitable are chlorodifluoromethane, fluoroform, and methylene fluoride. At temperatures between about 600° and about 650° C., the reaction proceeds at a favorable rate. At temperatures below 500° C. little reaction takes place, while at temperatures near and above 750° C. substantial decomposition occurs, but a larger proportion of 2-chlorotetrafluoropropionitrile is formed. A mole ratio of cyanogen chloride to difluoromethane of about 0.5 to about 1.4 may be used, but the preferred ratio is from about 0.9 to about 1.05. Higher mole ratios result in more chlorination, and lower mole ratios result in uneconomical conversions. Atmospheric pressure is generally used, but higher or lower pressures may be used, if desired. If higher pressures are used the HCl formed in the reaction must be bled off to obtain satisfactory results.

The present invention may be further illustrated, but is not to be construed as limited, by the following examples:

*Example I.—Preparation of chlorodifluoroacetonitrile, trifluoroacetonitrile and 2-chlorotetrafluoropropionitrile*

A ¾ inch tube of a special heat resistant glass ("Vycor") was packed with ¼ inch fused magnesium oxide ("Magnorite") spheres and heated at 635° to 640° C. over 24 inches of its length. Chlorodifluoromethane and cyanogen chloride were metered through the tube at one inch of water pressure on a 0.75 millimeter orifice. In 1½ hours, 0.54 mole of cyanogen chloride and 0.52 mole of chlorodifluoromethane were passed through the tube giving a $CNCl/CHClF_2$ mole ratio of 1.03 and a contact time of 11.9 seconds. Low temperature distillation of the product resulted in an organic recovery of 92.3 percent and a yield of 51.5 mole percent of chlorodifluoroacetonitrile, boiling at −18° C., a yield of 8.0 mole percent of 2-chlorotetrafluoropropionitrile, boiling at +5° C., and a yield of 7.0 mole percent of trifluoroacetonitrile, boiling at −62° C. to −64° C.

*Example II.—Reaction of cyanogen chloride with fluoroform*

In a manner similar to that of Example I, 0.83 mole of fluoroform and 0.41 mole of cyanogen chloride were passed through the "Vycor" tube at 700° C. in one hour and twelve minutes. This gave a $CNCl/CHF_3$ mole ratio of 0.50 and a contact time of 7.5 seconds. Low temperature distillation yielded trifluoroacetonitrile, chlorotrifluoromethane and chlorodifluoroacetonitrile.

In a manner similar to the foregoing examples methylenefluoride may be reacted with cyanogen chloride to give similar results.

Various modifications may be made in the present invent without departing from the spirit or scope thereof and it is understood that we limit ourselves only as defined in the appended claims.

We claim:

1. The process of preparing fluoronitriles which includes contacting cyanogen chloride at temperatures from about 500° C. to about 750° C., and for a contact time from about 5 to about 30 seconds with a difluoromethane containing from 0 to 1 chlorine atoms and having a molecular weight of from 52 to 87 and at a mole ratio of cyanogen chloride to difluoromethane of from about 0.5:1.4, and, separating from the reaction mixture which are fluoronitrile reaction products containing from 2 to 3 carbon atoms.

2. The process of preparing fluoronitriles which includes contacting cyanogen chloride at atmospheric pressure and at temperatures of about 600° C. to about 650° C., and for about 5 to about 30 seconds, with a difluoromethane containing from 0 to 1 chlorine atoms and having a molecular weight of from 52 to 87 and at a mole ratio of cyanogen chloride to difluoromethane of from about 0.5:1.4, and, separating from the reaction mixture fluoronitrile reaction products containing from 2 to 3 carbon atoms.

3. The process of preparing fluoronitriles which includes contacting cyanogen chloride at atmospheric pressure and at temperatures of about 600° C. to about 650° C., and for about 8 to about 10 seconds, with a difluoromethane containing from 0 to 1 chlorine atoms and having a molecular weight of from 52 to 87 and at a mole ratio of cyanogen chloride to difluoromethane of from about 0.5:1.4, and, separating from the reaction mixture fluoronitrile reaction products containing from 2 to 3 carbon atoms.

4. The process of preparing fluoronitriles which includes contacting, at atmospheric pressure and at temperatures of about 600° C. to about 650° C., and for about 8 to 10 seconds, about 1.05 molar equivalents of chlorodifluoromethane with about 0.9 molar equivalent of cyanogen chloride, and separating chlorodifluoroacetonitrile, trifluoroacetonitrile, and 2-chlorotetrafluoropropionitrile from the reaction mixture.

5. The process of preparing fluoronitriles which includes contacting, about 700° C., and for about 7.5 seconds, about 0.50 molar equivalents of cyanogen chloride with about 1.0 molar equivalent of fluoroform, and separating trifluoroacetonitrile, chlorotrifluoromethane and chlorodifluoroacetonitrile, from the reaction mixture.

References Cited in the file of this patent

FOREIGN PATENTS 794,559    Great Britain _____ May 7, 1958